United States Patent [19]

Hoxmeier et al.

[11] Patent Number: 5,057,582

[45] Date of Patent: Oct. 15, 1991

[54] HYDROGENATION CATALYST AND HYDROGENATION PROCESS WHEREIN SAID CATALYST IS USED

[75] Inventors: Ronald J. Hoxmeier, Houston; Lynn H. Slaugh, Cypress, both of Tex.

[73] Assignee: Shell Oil Company, Houston, Tex.

[21] Appl. No.: 289,158

[22] Filed: Dec. 23, 1988

[51] Int. Cl.$^5$ ............................................. C08F 8/04
[52] U.S. Cl. ................................. 525/338; 525/332.9; 525/339
[58] Field of Search .............................. 525/338, 339

[56] References Cited

U.S. PATENT DOCUMENTS

| | | | |
|---|---|---|---|
| 3,113,986 | 12/1963 | Breslow | 260/683.9 |
| 3,135,716 | 6/1964 | Uraneck et al. | 260/45.5 |
| 3,150,209 | 9/1964 | Short et al. | 260/894 |
| 3,231,635 | 1/1966 | Holden et al. | 260/880 |
| 3,265,765 | 8/1966 | Holden et al. | 260/876 |
| 3,322,856 | 5/1967 | Holden et al. | 260/876 |
| 3,412,174 | 11/1968 | Kroll | 260/683.9 |
| 3,496,154 | 2/1970 | Wofford | 260/84.7 |
| 3,498,960 | 3/1970 | Wofford | 260/84.7 |
| 3,541,064 | 11/1970 | Yoshimoto et al. | 260/85.1 |
| 3,700,633 | 10/1972 | Wald et al. | 260/880 B |
| 4,033,888 | 7/1977 | Kiovsky | 252/56 D |
| 4,077,893 | 3/1978 | Kiovsky | 252/56 R |
| 4,141,847 | 2/1979 | Kiovsky | 252/51.5 A |
| 4,145,298 | 3/1979 | Trepka | 252/51.5 A |
| 4,238,202 | 12/1980 | Trepka et al. | 44/62 |
| 4,271,323 | 6/1981 | Durand et al. | 568/816 |
| 4,391,949 | 7/1983 | St. Clair | 525/99 |
| 4,444,953 | 8/1987 | St. Clair | 525/98 |
| 4,581,417 | 4/1986 | Buding et al. | 525/338 |
| 4,631,315 | 12/1986 | Buding et al. | 525/338 |
| 4,665,208 | 5/1987 | Welborn, Jr. et al. | 556/179 |
| 4,674,627 | 6/1987 | Benlcio | 198/821 |
| 4,876,314 | 10/1989 | Hoxmeier | 525/329.3 |

FOREIGN PATENT DOCUMENTS 1030306  5/1966  United Kingdom .
1558491  1/1980  United Kingdom .

Primary Examiner—Bernard Lipman

[57] ABSTRACT

A hydrogenation catalyst prepared by combining a Group VIIIA metal compound and an alkylalumoxane and a hydrogenation process wherein said catalyst is used to hydrogenate compounds or materials containing ethylenic and/or aromatic unsaturation. The Group VIIIA metal compound is selected from the group of compounds consisting of carboxylates, chelates, alkoxides, salts of acids containing sulfur, salts of partial half esters of acids containing sulfur and salts of aliphatic and aromatic sulfonic acids. Nickel and cobalt compounds are preferred for use in preparing the hydrogenation catalyst. Hydrogenation catalysts prepared with methylalumoxane initially exhibit less hydrogenation activity than catalysts known heretofore in the prior art and prepared with a metal alkyl of a metal selected from Groups I, II and III. These catalysts, then, permit or enable greater control over the extent of hydrogenation, particularly when partial hydrogenation is a desired end result. Ultimately, however, the catalyst permits substantially complete hydrogenation of both ethylenic and aromatic unsaturation. Hydrogenation catalysts prepared with higher alkyl ($C_2$–$C_8$) alumoxanes on the other hand are generally more active at all hydrogenation times at least those greater than about 30 minutes.

28 Claims, No Drawings

5,057,582

HYDROGENATION CATALYST AND HYDROGENATION PROCESS WHEREIN SAID CATALYST IS USED

BACKGROUND

1. Field of the Invention

This invention relates to a hydrogenation catalyst and a hydrogenation process wherein said catalyst is used. More particularly, this invention relates to a hydrogenation catalyst and to a process wherein said catalyst is used to saturate ethylenic and/or aromatic unsaturation.

2. Prior Art

Catalyst for hydrogenating chemical compounds containing ethylenic and/or aromatic unsaturation, are, of course, well known in the prior art. Useful catalysts include such heterogeneous catalysts as nickel on kieselguhr, Raney nickel, copper chromate, molybdenum sulfide, finely divided platinum, finely divided palladium, platinum oxide, copper chromium oxide and the like, as taught, for example, in U.S. Pat. No. 3,333,024. Useful catalysts also include homogeneous systems such as those prepared with rhodium compounds or complexes, as taught, for example, in U.K. Patent No. 1,558,491 and in U.S. Pat. Nos. 4,581,417 and 4,674,627 and those prepared with ruthenium complexes as taught, for example, in U.S. Pat. No. 4,631,315. As is known in the prior art, certain of these catalysts are quite effective in the hydrogenation of ethylenic unsaturation but many of these catalysts are not particularly selective as between ethylenic and aromatic unsaturation and therefore cannot be effectively used to selectively hydrogenate ethylenic unsaturation in a compound containing both ethylenic and aromatic unsaturation. Moreover, certain of these catalyst are not, generally, practical for use in large scale commercial operations where catalyst recovery is inefficient as in polymer hydrogenation processes. In this regard, it should be noted that the precious metals used in certain of these catalysts are available only in limited supply which makes these catalysts very costly when compared to the costs of these catalysts commonly used in polymer hydrogenation processes.

Catalysts which are useful in the hydrogenation of ethylenic unsaturation, which catalyst may be used selectively as between ethylenic and aromatic unsaturation, also include catalysts which are frequently referred to as homogeneous systems, prepared by combining an iron group metal compound, particularly a nickel or cobalt compound, with a reducing agent. Such catalyst may be the reaction product of an iron group metal alkoxide and an aluminum hydrocarbon compound as taught, for example, in U.S. Pat. No. 3,113,986; the reaction product of an iron group metal carboxylate, chelate or alkoxide and a lithium or magnesium hydrocarbon compound as taught, for example, in U.S. Pat. No. 3,541,064., the reaction product of a nickel or cobalt alkoxide or carboxylate and an aluminum trialkyl as taught, for example, in U.S. Pat. No. 3,700,633 or the reaction product of an iron group carboxylate, an enolate, a phenolate or a salt of certain sulfur-containing acids and half esters thereof and a metal alkyl of a metal selected from Groups I, II and III as taught for example in British Patent Specification 1,030,306. It is also known to use iron group metal compounds containing from about 0.4 to about 1.3 mols of water per mole of iron group metal compound in preparing catalysts of this type. Reducing agents that may be used in preparing catalysts include metal alkoxides as taught, for example, in U.S. Pat. Nos. 3,412,174 and 4,271,323. As is known in the prior art, these catalysts can be used in a manner such that essentially all of any ethylenic unsaturation contained in the chemical compound is hydrogenated while essentially none of the aromatic unsaturation contained therein is hydrogenated. These catalysts, are, however, generally, less active than the non-selective catalysts heretofore known in the prior art, and, as a result, longer holding times are required to effect the desired degree of selective hydrogenation. Moreover, most, if not all, of these selective catalysts generally result in significant conversion of ethylenic unsaturation in relatively short contacting times and then proceed rather slowly with respect to such conversion thereafter, thereby preventing good control over the extent of conversion of the ethylenic unsaturation when partial hydrogenation is the desired objective.

In light of these deficiencies of the prior art hydrogenation catalysts, then, the need for a catalyst which can be used to selectively hydrogenate ethylenic unsaturation in a chemical compound containing both ethylenic and aromatic unsaturation, which catalyst may be prepared with metals that are more readily available and which catalyst will provide greater hydrogenation after a reasonable contacting time when compared to the selective catalyst known in the prior art, is believed to be readily apparent. The need for a catalyst which will afford better control over the extent of hydrogenation is also believed to be readily apparent.

SUMMARY OF THE INVENTION

It has now been discovered that the foregoing and other disadvantages of the prior art catalyst useful in hydrogenating ethylenic and/or aromatic unsaturation can be overcome or at least significantly reduced with the catalyst of this invention. It is, therefore, an object of the present invention to provide an improved catalyst for hydrogenating ethylenic and/or aromatic unsaturation. It is another object of this invention to provide a hydrogenation process wherein said improved catalyst is used to hydrogenate ethylenic and/or aromatic unsaturation. It is still another object of this invention to provide such an improved hydrogenation catalyst which can be used to selectively hydrogenate ethylenic unsaturation when aromatic unsaturation is also present. It is a still further object of this invention to provide such an improved hydrogenation catalyst which will enable increased hydrogenation after a reasonable holding time when compared to known selective hydrogenation catalyst. It is even a further object to provide certain improved hydrogenation catalysts which will afford better control over the extent to which the hydrogenation has proceeded. The foregoing and other objects and advantages will become apparent from the description set forth hereinafter.

In accordance with the present invention, the foregoing and other objects and advantages are accomplished with a catalyst obtained by contacting one or more Group VIIIA metal compounds and one or more alkylalumoxanes and with a process wherein said catalyst is used to partially or completely hydrogenate ethylenic and/or aromatic unsaturation. As used herein, all reference to metals of a specified Group shall be by reference to the Groups as depicted in the Periodic Table of the Elements by Mendeleev, Long Form, as published in Kirk-Othmer Encyclopedia of Chemical Technology, 2nd, 1964, Vol. 8, Page 94. As discussed more fully hereinafter, the catalysts of this invention may also be used to selectively hydrogenate ethylenic unsaturation in a compound containing both ethylenic and aromatic unsaturation. As also discussed more fully hereinafter, the extent of hydrogenation, initially at least, proceeds slowly with certain of the catalysts herein contemplated, thereby making it possible to more accurately control the extent of hydrogenation. The catalysts further may be used at more severe hydrogenation conditions so as to hydrogenate both ethylenic and aromatic unsaturation in compounds containing both types of unsaturation.

DETAILED DESCRIPTION OF THE INVENTION

As just indicated supra, the present invention is drawn to a catalyst prepared by contacting one or more Group VIIIA metal compounds with one or more alkylalumoxanes and to a hydrogenation process wherein said catalyst is used to partially or completely hydrogenate ethylenic and/or aromatic unsaturation. The catalysts may also be used to selectively hydrogenate ethylenic unsaturation in a compound containing both ethylenic and aromatic unsaturation. Certain of the catalysts may be used to more carefully control the extent of hydrogenation in such compounds. The catalysts may still further be used, generally, at more severe hydrogenation conditions so as to hydrogenate at least a portion of both the ethylenic and aromatic unsaturation in compounds containing both types of unsaturation. As a matter of convenience, the one or more alkylalumoxanes will frequently be referred to herein simply as an alumoxane.

In general, any of the Group VIIIA metal compounds known to be useful in the preparation of catalysts for the hydrogenation of ethylenic unsaturation can be used separately or in combination to prepare the catalyst of this invention. Suitable compounds, then, include Group VIIIA metal carboxylates having the formula $(RCOO)_nM$ wherein M is a Group VIIIA metal, R is a hydrocarbyl radical having from 1 to about 50 carbon atoms, preferably from about 5 to 30 carbon atoms, and n is a number equal to the valence of the metal M; Group VIIIA metal chelates containing from about 3 to about 50 carbon atoms, preferably from about 3 to about 20 carbon atoms., alkoxides having the formula $(RCO)_nM$ wherein M is again a Group VIIIA metal, R is a hydrocarbon radical having from 1 to about 50 carbon atoms, preferably about 5 to about 30 carbon atoms, and n is a number equal to the valence of the metal M; salts of sulfur-containing acids having the general formula $M(SO_x)_n$ and partial esters thereof; and Group VIIIA metal salts of aliphatic and aromatic sulfonic acids having the general formula $M(R'SO_3)n$ wherein R' is aliphatic or aromatic radical having from 1 to about 20 carbon atoms and n is a number satisfying the valence of M. Preferably, the Group VIIIA metal will be selected from the group consisting of nickel and cobalt, most preferably, the Group VIIIA metal will be nickel. The carboxylates useful in preparing the catalyst of this invention include Group VIIIA metal salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, rhodinic acid and the like. Examples of hydrocarbon aromatic acids include benzoic acid and alkyl-substituted aromatic acids in which the alkyl substitution has from 1 to about 20 carbon atoms. Examples of cycloaliphatic acids include naphthenic acid, cyclohexylcarboxylic acid, abietic-type resin acids and the like. Suitable chelating agents which may be combined with certain Group VIIIA metal compounds thereby yielding a Group VIIIA metal chelate compound useful in the preparation of the catalyst of this invention include $\beta$-ketones, $\alpha$-hydroxycarboxylic acids, $\beta$-hydroxycarboxylic acids, $\beta$-hydroxycarbonyl compounds and the like. Examples of $\beta$-ketones which may be used include acetylacetone, 1,3-hexanedione, 3,5-nonadione, methylacetoacetate, ethylacetoacetate and the like. Examples of $\alpha$-hydroxycarboxylic acid which may be used include lactic acid, glycolic acid, $\alpha$-hydroxyphenylacetic acid, $\alpha$-hydroxy-$\alpha$-phenylacetic acid, $\alpha$-hydroxycyclohexylacetic acid and the like. Examples of $\beta$-hydroxycarboxylic acids include salicylic acid, alkyl-substituted salicyclic acids and the like. Examples of $\beta$-hydroxylcarbonyl compounds that may be used include salicylaldehyde, o-hydroxyacetophenone and the like. The metal alkoxides which are useful in preparing catalysts of this invention include Group VIIIA metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, dodecanol and the like. The Group VIIIA metal salts of sulfur-containing acids and partial esters thereof include Group VIIIA metal salts of sulfonic acid, sulfuric acid, sulfurous acid, partial esters thereof and the like. Group VIIIA metal salts of aromatic acids such as benzene sulfonic acid, p-toluene sulfonic acid and the like are particularly useful. The Group VIIIA metal compounds used to prepare the catalysts of this invention may, but need not, contain water. When water is present, the amount of water present may range up to about 1.3 moles of water per mole or atom of Group VIIIA metal, particularly from about 0.3 moles to about 1.3 moles of water per mole or atom of Group VIIIA metal.

In general, any of the alkylalumoxane compounds known to be useful in the preparation of olefin polymerization catalyst as taught, for example, in U.S. Pat. No. 4,665,208, the disclosure of which patent is herein incorporated by reference, may be used separately or in combination in preparing the hydrogenation catalyst of this invention. Alumoxane compounds useful in preparing the catalyst of this invention may, then, be cyclic or linear. Cyclic alumoxanes may be represented by the general formula $(R-Al-O)_m$ while linear alumoxanes may be represented by the general formula $R_2AlO$; $(RAlO-_nAlR2$. In both of the general formulae each R and $R_2$, independently, will be the same or a different alkyl group having from 1 to about 8 carbon atoms such as, for example, methyl, ethyl, propyl, butyl and pentyl; m is an integer from about 3 to about 40, preferably about 5 to about 20, and n is an integer from 1 to about 40, preferably about 10 to about 20. In a preferred embodiment of the present invention, each R will be methyl. As is well known, alumoxanes may be prepared by reacting an aluminum alkyl with water. Generally, the resulting product will be a mixture of both linear and cyclic compounds.

As is well known, contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, about 1 mole of hydrated ferrous sulfate will be contacted with from about 6 to about 7 moles of the aluminum trialkyl. When aluminum trimethyl is the aluminum alkyl actually used, methane will be evolved as conversion of the aluminum alkyl to an alumoxane occurs.

In general, the actual hydrogenation catalyst will be prepared by contacting the one or more Group VIIIA metal compounds with the one or more alumoxanes in a suitable solvent at a temperature within the range from about 20° C. to about 100° C. and continuing the contacting for a period of time with the range from about 1 to about 120 minutes. In general, the solvent used for preparing the catalyst may be anyone of those solvents known in the prior art to be useful as solvents for unsaturated hydrocarbon polymers. Suitable solvents include aliphatic hydrocarbons such as hexane, heptane, octane and the like, cycloaliphatic hydrocarbons such as cyclopentane, cyclohexane, and the like, alkyl-substituted cycloaliphatic hydrocarbons such as methylcyclopentane, methylcyclohexane, methylcyclooctane and the like, aromatic hydrocarbons such as benzene, hydroaromatic hydrocarbons such as decalin, tetralin and the like, alkyl-substituted aromatic hydrocarbons such as toluene, xylene and the like and halogenated aromatic hydrocarbons such as chlorobenzene and the like. In general, a suitable hydrogenation catalyst can be prepared by combining the components used to prepare the catalyst in a separate vessel prior to feeding the same to the hydrogenation reactor or the separate components can be fed directly to the hydrogenation reactor when the hydrogenation is accomplished at a temperature at which the separate components will yield an active catalyst. Preferably, the Group VIIIA metal compound will be combined with the alumoxane in a separate vessel prior to feeding the mixture and any reaction product therefrom to the hydrogenation reactor. In general, the components used to prepare the catalyst will be combined in a ratio sufficient to provide from about 1.5 to about 20 moles or atoms of aluminum per mole or atom of Group VIIIA metal when the catalyst is prepared.

In general, the hydrogenation catalyst of this invention may be used to hydrogenate any hydrocarbon or substituted hydrocarbon containing either ethylenic unsaturation and/or aromatic unsaturation. The catalyst of this invention is particularly useful for the hydrogenation of hydrocarbon and substituted hydrocarbon polymers. When the hydrocarbon or substituted hydrocarbon polymer to be hydrogenated contains both ethylenic and aromatic unsaturation, the hydrogenation catalyst of this invention can be used at hydrogenation temperatures, hydrogen partial pressures and nominal holding times which will enable partial, complete or selective hydrogenation. In this regard, it will be appreciated that ethylenic unsaturation, particularly that which does not contain hydrocarbyl substitution on both of the carbon atoms contained in the ethylenic unsaturation group will hydrogenate at milder hydrogenation conditions than will aromatic unsaturation. As a result, selective hydrogenation can be accomplished such that at least a portion of the ethylenic unsaturation is hydrogenated while essentially none of the aromatic unsaturation is hydrogenated. In fact, selective hydrogenation can be accomplished with the hydrogenation catalyst of this invention such that substantially all of the ethylenic unsaturation which does not contain hydrocarbyl substitution on both of the carbon atoms; i.e., all ethylenic unsaturation containing at least one hydrogen atom, contained in the ethylenic unsaturation group can be saturated while essentially none of the aromatic unsaturation is hydrogenated. At more severe conditions, however, at least a portion of the aromatic unsaturation will also be hydrogenated and if contacting is continued for a sufficient period of time substantially all of the ethylenic and aromatic unsaturation can be hydrogenated.

The hydrogenation catalyst of this invention may be used to hydrogenate essentially any polymer containing ethylenic and/or aromatic unsaturation. The hydrogenation catalyst of this invention will also hydrogenate any acetylenic unsaturation that may be contained in a polymer. In general, however, and while the polymer or other hydrocarbon may be substituted with various functional groups, the polymers or other hydrocarbon actually hydrogenated with the hydrogenation catalyst of this invention should be essentially free of functional groups that will react with the catalyst or a component used to prepare the catalyst thereby deactivating the same. In general, such groups include both those which are strongly acidic (pH<5) and those which are strongly basic (pH>9). The substitutions that may be on the hydrocarbon, then, would be those which, when dissolved in water, would have a pH within the range from about 5 to about 9.

The hydrogenation catalyst of this invention will be particularly effective for hydrogenating polymers containing ethylenic unsaturation and/or aromatic unsaturation. As is well known, polymers containing ethylenic unsaturation can be prepared by polymerizing one or more polyolefins, particularly diolefins. The polyolefins may be polymerized alone or in combination with other vinyl monomers such as acrylates, methacrylates, vinyl- and allylalcohols, vinyl and allylethers, vinyl halides, vinylidene halides, and the like. Polymers containing aromatic unsaturation may be prepared by polymerizing one or more alkenyl aromatic hydrocarbons. The alkenyl aromatic hydrocarbons may be polymerized alone or in combination with other copolymerizable vinyl monomers such as olefins, acrylates, methacrylates, vinyl and allyl ethers, vinyl halides, and the like to produce polymers containing aromatic unsaturation. As is also well known, polyolefins, particularly conjugated diolefins, and alkenyl aromatic hydrocarbon, particularly monoalkenyl aromatic hydrocarbons, can be copolymerized to produce polymers containing both ethylenic and aromatic unsaturation. The hydrogenation catalyst of this invention may be used to either partially or substantially completely hydrogenate ethylenic unsaturation contained in a polymer. The hydrogenation catalyst of this invention may also be used to either partially or completely hydrogenate aromatic unsaturation contained in a polymer. The hydrogenation catalyst of this invention may further be used to selectively hydrogenate ethylenic unsaturation in polymers containing both ethylenic and aromatic unsaturation. As used herein, the recitation "selective hydrogenation" shall mean hydrogenation accomplished such that ethylenic unsaturation is hydrogenated while aromatic unsaturation is not hydrogenated or at least wherein the amount of ethylenic unsaturation hydrogenated is significantly greater than the amount of aromatic unsaturation hydrogenated.

As is well known in the prior art, polymers containing ethylenic and/or aromatic unsaturation may be prepared using free-radical, cationic and anionic initiators or polymerization catalysts. Such polymers may also be prepared using bulk, solution or emulsion techniques. It is, of course, known in the prior art that all polymers cannot be prepared with each of these initiators or catalysts and that all polymers cannot be prepared with each of the different techniques. Which polymers may be prepared with the several catalysts and which polymers may be prepared with the various techniques is, however, well known in the prior art and need not be discussed herein in detail. As indicated more fully hereinafter, however, the actual hydrogenation of the polymer will be accomplished in solution. It is, therefore, important to the hydrogenation method of this invention that the unsaturated hydrocarbon or substituted unsaturated hydrocarbon be soluble in a solvent.

As indicated supra, the hydrogenation catalyst of this invention is particularly useful for hydrogenating hydrocarbon polymers containing ethylenic and/or aromatic unsaturation. The present invention will, therefore, be described in greater detail by reference to such polymers. It should, however, be kept in mind, as also indicated supra, that any unsaturated hydrocarbon or substituted unsaturated hydrocarbon or any polymer containing such unsaturation which is also soluble in a suitable solvent could be substituted for the hydrocarbon polymer with which the invention will be described in greater detail. Also, while the polymer actually hydrogenated may be prepared using bulk, solution or emulsion techniques, as indicated supra, the invention is particularly effective with polymers prepared in solution since the hydrogenation may be accomplished immediately after preparation thereof with a reduced number of steps. Polymers prepared with bulk or emulsion techniques, however, could be recovered and then dissolved in a solvent to effect hydrogenation with the hydrogenation catalyst of this invention.

As is well known, homopolymers of conjugated diolefins, copolymers of conjugated diolefins and copolymers of one or more conjugated diolefins and one or more other monomers, particularly a monoalkenyl aromatic hydrocarbon monomer, are commonly prepared in solution with an anionic polymerization initiator and the hydrogenation catalyst of this invention is particularly effective in both the partial, complete and selective hydrogenation of such polymers. As is well known, such polymers may be random, tapered, block branched or radial. In general, polymers of this type are prepared by contacting the monomer or monomers to be polymerized with an organoalkali metal compound in a suitable solvent at a temperature within the range from about −150° C. to about 300° C., preferably at a temperature within the range from about 0° C. to about 100° C. When the polymer is to be tapered, all of the monomers to be contained in the polymer are, frequently, introduced together at the beginning of the polymerization. When the polymer is to be random, a randomizing agent is generally used. When the polymer is to be a linear block, the monomers are, generally, polymerized sequentially and when the polymer is to be a radial polymer, the polymeric arms are first prepared and then coupled with a satisfactory coupling agent. Particularly effective anionic polymerization initiators are organolithium compounds having the general formula:

$$RLi_n$$

wherein:
R is an aliphatic, cycloaliphatic, aromatic or alkyl-substituted aromatic hydrocarbon radical having from 1 to about 20 carbon atoms; and
n is an integer of 1 to 4.

Conjugated diolefins which may be polymerized separately or in combination anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 6 carbon atoms are, preferably, used in such polymers and conjugated diolefins containing 4 or 5 carbon atoms are most preferably used in such polymers. The conjugated diolefin polymers prepared via anionic initiation may contain one or more other monomers, particularly a monoalkenyl aromatic hydrocarbon monomer. Suitable monoalkenyl aromatic hydrocarbon monomers include styrene, various alkyl-substituted styrenes, alkoxy-substituted styrenes, vinyl naphthalene, alkyl-substituted vinyl naphthalenes and the like. Conjugated diolefin polymers which may be hydrogenated with the hydrogenation catalyst of the present invention include those homopolymers and copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin polymers which may be partially, completely or selectively hydrogenated with the hydrogenation catalyst of this invention also include block copolymers such as those described in U.S. Pat. Nos. 3,231,635; 3,265,765 and 3,322,856, the disclosure of which patents are also incorporated herein by reference. In general, linear block copolymers which may be hydrogenated in accordance with the present invention include those which may be represented by the general formula:

$$A_z\text{-}(B\text{-}A)_y\text{-}B_x$$

wherein:
A is a polymeric block comprising predominantly monoalkenyl aromatic hydrocarbon monomer units;
B is a polymeric block containing predominantly conjugated diolefin monomer units.,
x and z are, independently, a number equal to 0 or 1, and
y is a whole number ranging from 1 to about 15.

Conjugated diolefin polymers which may be partially, completely or selectively hydrogenated with the hydrogenation catalyst of this invention further include radial block copolymers such as those described in U.S. Pat. Nos. 4,033,888; 4,077,893; 4,141,847; 4,391,949 and 4,444,953, the disclosure of which patents are also incorporated herein by reference. Radial block copolymers which may be hydrogenated with the hydrogenation catalyst of the present invention include those which may be represented by the general formulae:

$$[B_x\text{-}(A\text{-}B)_y\text{-}A_z]_n\text{-}C;\text{ and}$$

$$(A\text{-}B)_{y'}C\text{-}B'_{z'}$$

wherein:

A, B, x, y and z are as previously defined;

n is a number from 3 to 30;

c is the core or nucleus of the radial polymer formed with a polyfunctional coupling agent;

B' is a polymeric block containing predominantly conjugated diolefin units, which B' may be the same or different from B; and y' and z' are integers representing the number of each type of arm.

In general, hydrogenation of the unsaturated polymer with the hydrogenation catalyst of this invention may be accomplished in any of the solvents for such polymers known in the prior art. Such solvents include straight- and branched-chain aliphatic hydrocarbons, cycloaliphatic hydrocarbons, alkyl-substituted cycloaliphatic hydrocarbons, aromatic hydrocarbons, alkyl-substituted aromatic hydrocarbons, linear and cyclic ethers, ketones and the like. Suitable solvents then include, but are not limited to, pentane, hexane, heptane, octane, cyclohexane, cycloheptane, methylcyclohexane, benzene, toluene, xylene and the like. In general, the solution of polymer and solvent will contain from about 1 wt % to about 30 wt % polymer and from about 99 wt % to about 70 wt % solvent.

In general, the hydrogenation will be accomplished at a temperature within the range from about 20° C. to about 175° C. at a total pressure within the range from about 50 psig to about 5,000 psig and at a hydrogen partial pressure within the range from about 50 to about 3,000 psig. In general, the catalyst or the components thereof will be added in a concentration sufficient to provide from about 0.2 to about 100 m/moles of Group VIIIA metal per lb of polymer or other compound being hydrogenated. In general, contacting at hydrogenation conditions will be continued for a nominal holding time within the range from about 10 to about 360 minutes. It will, of course, be appreciated that the more severe hydrogenation conditions at longer nominal holding times will, generally, result in complete or near complete hydrogenation of the polymer while milder hydrogenation conditions and shorter holding times favor partial hydrogenation and may be used to effect selective hydrogenation as between ethylenic and aromatic unsaturation. Of the several variables available to control the extent of hydrogenation, temperature and catalyst concentration and nominal holding time, generally, have the greatest affect on the extent of hydrogenation, particularly where selective hydrogenation is the desired result. Hydrogen partial pressure, on the other hand, generally, has a lesser affect on selectivity as between the hydrogenation of ethylenic unsaturation and hydrogenation of aromatic unsaturation. Nominal holding time will, of course, significantly affect the extent of hydrogenation in those cases where partial hydrogenation of either ethylenic unsaturation or aromatic unsaturation is the desired result.

In general, selective hydrogenation as between ethylenic and aromatic unsaturation will be accomplished at a temperature within the range from about 20 to about 100° C at a total pressure within the range from about 50 to about 1,000 psig at a hydrogen partial pressure within the range from about 50 to about 950 psig and at a catalyst concentration within the range from about 0.4 to about 40 m/moles of Group VIIIA metal per pound of polymer or other compound being hydrogenated. Nominal holding times within the range from about 30 to about 240 minutes will, generally, be used to effect selective hydrogenation. In general, the hydrogenation catalyst of this invention can be used to effect substantially complete hydrogenation of any ethylenic unsaturation contained in a polymer without effecting hydrogenation of any aromatic unsaturation contained in the same polymer. Partial hydrogenation of the ethylenic unsaturation in such a polymer can, of course, be accomplished by reducing the nominal holding time, the temperature, the catalyst concentration and/or the hydrogen partial pressure. In general, partial, complete and/or selective hydrogenation will be accomplished without any significant degradation of the polymer.

While the inventor does not wish to be bound by any particular theory, it is believed that when the components used to prepare the hydrogenation catalyst of this invention are combined a reaction occurs to form a catalyst. The catalyst thus formed is stable and can be stored for relatively long periods prior to use.

After hydrogenation of the polymer has been completed, the polymer may be recovered as a crumb using techniques well known in the art such as by adding a polar compound such an alcohol or the like to the polymer solution thereby precipitating the polymer as a crumb. Alternatively, the solution may be contacted with steam or hot water and the solvent then removed by azeotropic distillation. Generally, these recovery techniques will also effectively remove a significant portion of the catalyst. To the extent that further catalyst removal is desired, however, methods well known in the prior art may be used. In general, a significant portion of the catalyst residue may be separated by contacting the polymer or polymer solution with a dilute acid.

The hydrogenated polymers produced by the method of this invention can be used in any of the applications well known in the prior art for such hydrogenated polymers. For example, hydrogenated conjugated diolefin polymers will have improved green strength and cold flow properties and may be used in as VI improvers, impact modifiers, in adhesive compositions and the like. Similarly, selectively hydrogenated conjugated diolefin-monoalkenyl aromatic hydrocarbon polymers may be used in various molding compositions, in adhesives compositions, as VI improvers, as impact modifiers and the like.

PREFERRED EMBODIMENT OF THE INVENTION

In a preferred embodiment of the present invention, a Group VIIIA metal compound selected from the group consisting of nickel carboxylates and cobalt carboxylates having from about 5 to about 30 carbon atoms will be combined with a blend of alumoxanes, having the general formulae $(R\text{-}Al\text{-}O)_m$ and $R_2AlO(RAlO\text{-}_nAlR_2$ wherein R and $R_2$, independently, is a lower alkyl ($C_1$–$C_3$) radical, to produce a hydrogenation catalyst. In the preferred embodiment, m will be a number from about 3 to about 20 and n will be a number from about 10 to about 20. The contacting between the components used to prepare the catalyst will be accomplished at a temperature within the range from about 25° C. to about 60° C. in a cycloaliphatic hydrocarbon solvent and the contacting will be continued for a period of time within the range from about 15 to about 60 minutes. In the preferred embodiment, the contacting will be accomplished at an Al:Ni or Al:Co atomic ratio within the range from about 2:1 to about 12:1, most preferably within a range from about 7:1 to about 10:1 on a mole or atom basis. In a most preferred embodiment of the present invention, a nickel carboxylate will be used and the nickel carboxylate will, even more preferably, be selected from the group consisting of nickel octoate and nickel ethylhexanoate and the cycloaliphatic hydrocarbon solvent will be cyclohexane. In a preferred process embodiment of the present invention, a preferred catalyst will be used to selectively hydrogenate a block copolymer comprising at least one polymeric block containing predominantly monoalkenyl aromatic hydrocarbon monomer units and at least one polymeric block containing predominantly conjugated diolefin monomer units. The recitation predominantly as used herein in connection with polymer block composition shall mean that the specified monomer or monomer type is the principal monomer or monomer type (at least about 85 wt %) contained in that polymer block. Other copolymerizable monomer units may, however, be present. In the preferred embodiment, the monoalkenyl aromatic hydrocarbon polymer blocks will have a weight average molecular weight within the range from about 5,000 to about 40,000 and the conjugated diolefin polymer blocks will have a weight average molecular weight within the range from about 25,000 to about 125,000. In a preferred process embodiment, the hydrogenation will be accomplished in a cycloaliphatic hydrocarbon solvent, the solution containing from about 10 to about 25 wt % polymer and from about 90 to about 75 wt % solvent. In the preferred process embodiment, the hydrogenation will be accomplished at a temperature within the range from about 20° to about 100° C. at a total pressure within the range from about 100 to about 1,000 psig and at a hydrogen partial pressure within the range from about 50 to about 950 psig and at a catalyst concentration within the range from about 1 to about 10 m/moles of Group VIIIA metal per pound of polymer. In the preferred process embodiment, the hydrogenation conditions will be continued for a nominal holding time within the range from about 30 to about 240 min. In the preferred process embodiment, the selective hydrogenation will be accomplished so as to hydrogenate at least 80% of the ethylenic unsaturation initially contained in the polymer and less than about 5% of the aromatic unsaturation contained therein. In a most preferred process embodiment, a most preferred catalyst will be used and the selective hydrogenation will be accomplished so as to hydrogenate at least 90% of the ethylenic unsaturation initially contained in the polymer while hydrogenating essentially none of the aromatic unsaturation contained therein.

Having thus broadly described the present invention and a preferred and most preferred embodiment thereof, it is believed that the invention will become even more apparent by reference to the following Examples. It will be appreciated, however, that the examples are presented solely for purposes of illustration and should not be construed as limiting the invention unless one or more of the limitations introduced in the Examples are incorporated into the claims appended hereto and then only to the extent that such limitations are thus incorporated.

EXAMPLE 1

In this Example, a series of hydrogenation catalysts were prepared by combining a methylalumoxane, prepared by contacting trimethyl aluminum with water, with nickel-2-ethylhexanoate in cyclohexane at a temperature of 25° C. and allowing the contacting to continue for about 30 minutes. The nickel-2-ethylhexanoate contained about 0.5 moles $H_2O$ per mole of nickel-2-ethylhexanoate. In preparing the series of catalysts in this Example, the amount of methyl alumoxane combined with nickel-2-ethylhexanoate was progressively increased so as to produce hydrogenation catalysts from mixtures having different Al:Ni ratios in the reaction mixture. Specifically, catalysts were prepared with alumoxane-nickel-2-ethylhexanoate reaction mixtures having Al:Ni atomic ratios of 1:1, 2:1, 4:1, 7:1, and 10:1. For convenience, these catalysts will be referred to as catalyst 1-5, respectively, hereinafter. Each of these catalysts were used shortly after preparation to hydrogenate a block copolymer as summarized in Example 3.

EXAMPLE 2

In this Example, a catalyst was prepared by combining a nickel-2-ethylhexanoate identical to that used in Example 1 with triethyl aluminum in cyclohexane at a temperature of 25° C. for about 30 minutes. In preparing this catalyst, the nickel-2-ethylhexanoate and triethyl aluminum were combined in an Al:Ni atomic ratio of 2.2:1. This catalyst, which is hereinafter referred to as catalyst 6, was used shortly after preparation to hydrogenate a block copolymer as summarized in Example 4.

EXAMPLE 3

In this Example, the five catalysts prepared in Example 1 were used to hydrogenate a linear triblock copolymer comprising terminal polystyrene blocks, each polystyrene block having a weight average molecular weight of 7,200 and a central polybutadiene block having a weight average molecular weight of 35,300. In each of the hydrogenation runs, the polymer was dissolved in cyclohexane, the solution containing 20 wt % polymer and 80 wt % cyclohexane. In each run, 450 grams polymer solution (90 g of polymer) was charged to an autoclave, the contents of the autoclave blanketed with hydrogen at a total pressure of about 900 psig and a hydrogen partial pressure of about 900 psig and the contents of the autoclave then heated to 70° C. A sufficient amount of catalyst in 50 g cylcohexane was then injected into the autoclave to provide 100 ppm Ni, by weight, based on total solution. After the catalyst was injected, the reaction medium was raised to a temperature of 90° C. The contents of the autoclave were then held at these conditions for three hours while maintaining a hydrogen partial pressure of 900 psig. A sample of the reaction medium was withdrawn from the reactor after 30 minutes, 60 minutes, 2 hours and at the completion of the run and analyzed to determine the % of the initial ethylenic unsaturation which had been saturated. The extent of hydrogenation was determined using an ozone titration. Contacting between the polymer and the ozone was accomplished at 25° C. The amount of ozone actually reacting with the polymer is determined and this value then used to determine the amount of ethylenic unsaturation remaining. The results actually achieved in each of the five runs is summarized in the Table following Example 4.

EXAMPLE 4

In this Example, the catalyst prepared in Example 2 was used to selectively hydrogenate a triblock copolymer identical to that used in Example 3. The hydrogenation in this Example was completed at conditions identical to those used in Example 3 except that the different catalyst was used. The results obtained with this catalyst are summarized in the following Table.

TABLE

| Catalyst No. | Al:Ni Atomic Ratio | % Initial —C=C— converted after | | | |
|---|---|---|---|---|---|
| | | 30 min | 60 min | 120 min | 180 min |
| 1 | 1:1 | 0 | 0 | 0 | 0 |
| 2 | 2:1 | 20.6 | 54 | 80.3 | 88.7 |
| 3 | 4:1 | 12.3 | 41.5 | 70.0 | 86.7 |
| 4 | 7:1 | 25.5 | 55.4 | 89.9 | 94.0 |
| 5 | 10:1 | 31.7 | 60.3 | 89.9 | 94.0 |
| 6 | 2.2:1 | 83.0 | 88.5 | 92.7 | 93.4 |

As will be apparent from the data summarized in the preceding Table, the catalyst of this invention, particularly when the atomic ratio of aluminum to nickel was within the range from 2:1 to about 10:1 gave good results and when this ratio was within the range from about 7:1 to about 10:1 there was an increased conversion of initial ethylenic unsaturation after three hours when compared to a well known prior art catalyst (Catalyst No. 6) which has been used commercially to selectively hydrogenate styrene-butadiene and styrene-isoprene block copolymers. As will also be apparent from the data summarized in the preceding Table, the catalyst of this invention prepared with a methylalumoxane at all operable aluminum to nickel atomic ratios are initially less active than are the well known prior art hydrogenation catalysts. This feature of this particular hydrogenation catalyst will, then, permit far more effective control of partial hydrogenation when this is a desired end result. In this regard, it should be noted that 83% of the initial ethylenic unsaturation is converted with catalyst 6 after only 30 minutes while the conversion with catalyst of this invention ranges from a low of 12.3% to a maximum of 31.7%. As will further be apparent from the data summarized in the preceding Table, an aluminum to nickel atomic ratio of 1:1 is not sufficient to produce an active catalyst.

EXAMPLE 5

In this Example, two different hydrogenation catalysts were prepared using the same method as was used in Example 1. The first of these catalysts, which is hereinafter referred to as Catalyst No. 7, was prepared by contacting an alumoxane, prepared by contacting an equimolar blend of timethylaluminum and triethylaluminum with water, with a nickel-2-ethylhexanoate identical to that used in Example 1, while the second, which is hereinafter referred to as Catalyst No. 8, was prepared by contacting an ethylalumoxane, prepared by contacting triethylaluminum with water, with a nickel-2-ethylhexanoate identical to that used in Example 1. The atomic ratio of aluminum to nickel was maintained at 4:1 in preparing Catalyst No. 7 and at 3:1 in preparing Catalyst No. 8. These catalysts were used shortly after preparation to hydrogenate a polymer as described in Example 6.

EXAMPLE 6

In this Example, the two catalysts prepared in Example 5 were used to selectively hydrogenate a triblock copolymer identical to that used in Example 3 at the same conditions as were used in Example 3. As in Example 3, samples were withdrawn at 30, 60, 120 and 180 minutes and the extent of hydrogenation determined on each sample using ozone. In each of these runs, samples were also taken after 15 minutes and the extent of hydrogenation determined thereon in the same manner. The results obtained are summarized in the following Table.

TABLE

| Catalyst No. | Al:Ni Atomic Ratio | % Ethylenic unsaturation converted after | | | | |
|---|---|---|---|---|---|---|
| | | 15 min | 30 min | 60 min | 120 min | 180 min |
| 7 | 4:1 | 38.4 | 82.8 | 94.2 | 94.4 | 94.9 |
| 8 | 3:1 | 56.3 | 87.3 | 94.5 | 95.0 | 95.7 |

As will be apparent from the data summarized in the preceding Table, the initial activity of the catalyst prepared with the alumoxane blend containing a methylalumoxane was less than that of the catalyst prepared with an ethylalumoxane (cf. the conversion after 15 minutes). After 30 minutes, however, the activity of this catalyst was about equal to or better than the activity of a catalyst prepared with triethylaluminum (cf. Catalyst No. 6 of Example 3 with Catalyst No. 7). The catalyst prepared with an ethylalumoxane, on the other hand, was more active than the catalyst prepared with triethylaluminum at all times starting with and after 30 minutes. The data summarized in the preceding Table when coupled with the data summarized in the Table following Example 4 suggest that catalyst prepared at least in part with a methylalumoxane will permit best control over the extent of hydrogenation while catalysts prepared with higher alkyl alumoxanes such as ethylalumoxanes will generally be more active than catalyst prepared with triethylaluminum, at least after about 30 minutes hydrogenation time, over a broader range of Al:Ni atomic ratios, e.g., at least from about 3:1 to about 10:1.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A method for hydrogenating a block copolymer of a conjugated diene and a monoalkenyl aromatic hydrocarbon containing ethylenic and aromatic unsaturation comprising the steps of:

(a) contacting the block copolymer with hydrogen in a suitable solvent at a temperature within the range from about 20° C. to about 175° C. and a hydrogen partial pressure within the range from about 50 to about 3,000 psig and in the presence of a catalyst prepared by combining a nickel or cobalt compound with an alkylalumoxane at a temperature within the range from about 20° C. to about 100° C. and such that about 1.5 to about 20 moles or atoms of aluminum are added per mole or atom of nickel or cobalt, wherein the nickel or cobalt compound is selected from a group consisting of carboxylates, alkoxides, chelates, salts of sulfur-containing acids, salts of sulfur-containing acid partial esters, and salts of aliphatic or aromatic sulfonic acids;

(b) maintaining the contact in step (a) for a sufficient period of time to permit conversion of at least a portion of the ethylenic unsaturation contained in the block copolymer; and (c) recovering an at least partially hydrogenated block copolymer.

2. The method of claim 1 wherein the contacting in step (a) is continued for a nominal holding time within the range from about 10 to about 360 minutes.

3. The method of claim 1 wherein the nickel or cobalt compound is a carboxylate.

4. The method of claim 3 wherein the nickel or cobalt carboxylate contains from 1 to about 50 carbon atoms.

5. The method of claim 1 wherein the alkylalumoxane is combined with a nickel compound.

6. The method of claim 5 wherein the nickel compound is nickel-2-ethylhexanoate.

7. The method of claim 1 wherein the contacting in step (a) is accomplished at a temperature within the range from about 20° C. to about 100° C. at a total pressure within the range from about 50 to about 1,000 psig and at a hydrogen partial pressure within the range from about 50 to about 950 psig.

8. The method of claim 7 wherein the contacting in step (a) is continued for a nominal holding time within the range from about 30 to about 240 minutes.

9. The method of claim 1 wherein said alkylalumoxane is methylalumoxane.

10. The method of claim 1 wherein said alkylalumoxane is prepared by contacting a blend of trimethylaluminum and triethylaluminum with water.

11. The method of claim 1 wherein said alkylalumoxane is ethylalumoxane.

12. The method of claim 1 wherein said nickel or cobalt compound and said alkylalumoxane are combined in a ratio sufficient to provide an aluminum to nickel or cobalt atomic ratio within the range from about 2:1 to about 12:1.

13. The method of claim 12 wherein said ratio is within the range from about 7:1 to about 10:1.

14. A method for hydrogenating a block copolymer of a conjugated diene and a monoalkenyl aromatic hydrocarbon containing ethylenic and aromatic unsaturation, which block copolymer may contain a functional group selected from the group consisting of esters, alcohols, ethers and halides, comprising the steps of:

(a) contacting the block copolymer with hydrogen in a suitable solvent and in the presence of a catalyst prepared by combining a nickel or cobalt compound with an alkylalumoxane, wherein the nickel or cobalt compound is selected from a group consisting of carboxylates, alkoxides, chelates, salts of sulfur-containing acids, salts of sulfur-containing acid partial esters, and salts of aliphatic or aromatic sulfonic acids;

(b) maintaining the contact in step (a) for a sufficient period of time to permit conversion of at least a portion of the ethylenic unsaturation contained in the block copolymer; and (c) recovering an at least partially hydrogenated block copolymer.

15. The method of claim 14 wherein the contacting in step (a) is accomplished at a temperature within the range from about 20° C. to about 175° C. at a total pressure within the range from about 50 to about 5,000 psig and at a hydrogen partial pressure within the range from about 50 to about 3,000 psig.

16. The method of claim 15 wherein the contacting in step (a) is continued for a nominal holding time within the range from about 10 to about 360 minutes.

17. The method of claim 14 wherein the nickel or cobalt compound is a carboxylate.

18. The method of claim 17 wherein the nickel or cobalt carboxylate contains from 1 to about 50 carbon atoms.

19. The method of claim 14 wherein the nickel or cobalt compound and said alkylalumoxane are combined in a ratio sufficient to provide an aluminum to nickel or cobalt atomic ratio within the range from about 1.5:1 to about 20:1.

20. The method of claim 19 wherein the alkylalumoxane is combined with a nickel compound.

21. The method of claim 20 wherein the nickel compound is nickel-2-ethylhexanoate.

22. The method of claim 14 wherein the contacting in step (a) is accomplished at a temperature within the range from about 20° C. to about 100° C. at a total pressure within the range from about 50 to about 1,000 psig and at a hydrogen partial pressure within the range from about 50 to about 950 psig.

23. The method of claim 22 wherein the contacting in step (a) is continued for a nominal holding time within the range from about 30 to about 240 minutes.

24. The method of claim 14 wherein said alkylalumoxane is methylalumoxane.

25. The method of claim 14 wherein said alkylalumoxane is prepared by contacting a blend of trimethylaluminum and triethylaluminum with water.

26. The method of claim 14 wherein said alkylalumoxane is ethylalumoxane.

27. The method of claim 14 wherein said nickel or cobalt compound and said alkylalumoxane are combined in a ratio sufficient to provide an aluminum to nickel or cobalt atomic ratio within the range from about 2:1 to about 12:1.

28. The method of claim 27 wherein said ratio is within the range from about 7:1 to about 10:1.

* * * * *